(12) United States Patent
Butzmann

(10) Patent No.: US 9,331,504 B2
(45) Date of Patent: May 3, 2016

(54) METHOD FOR CHARGING A BATTERY

(75) Inventor: Stefan Butzmann, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 253 days.

(21) Appl. No.: 13/988,922

(22) PCT Filed: Nov. 18, 2011

(86) PCT No.: PCT/EP2011/070486
§ 371 (c)(1),
(2), (4) Date: Dec. 5, 2013

(87) PCT Pub. No.: WO2012/069388
PCT Pub. Date: May 31, 2012

(65) Prior Publication Data
US 2014/0084864 A1    Mar. 27, 2014

(30) Foreign Application Priority Data

Nov. 23, 2010 (DE) .......................... 10 2010 061 763

(51) Int. Cl.
| H02J 7/00 | (2006.01) |
| H01M 10/42 | (2006.01) |
| H01M 10/44 | (2006.01) |
| B60L 11/18 | (2006.01) |
| H02H 7/18 | (2006.01) |
| H02J 7/14 | (2006.01) |

(52) U.S. Cl.
CPC ........... *H02J 7/0029* (2013.01); *B60L 11/1809* (2013.01); *H01M 10/425* (2013.01); *H01M 10/44* (2013.01); *H02J 7/0031* (2013.01); *H02J 7/1492* (2013.01); *B60L 2210/30* (2013.01); *H02H 7/18* (2013.01); *H02J 7/1415* (2013.01); *Y02E 10/766* (2013.01); *Y02T 10/7011* (2013.01); *Y02T 10/7241* (2013.01)

(58) Field of Classification Search
CPC ... Y02T 90/14; Y02T 10/7005; Y02T 90/128; Y02T 10/7088; Y02T 90/163
USPC .......................................................... 320/109
See application file for complete search history.

(56) References Cited

U.S. PATENT DOCUMENTS

| 4,091,319 | A | * | 5/1978 | Nguyen ........................ 320/140 |
| 5,731,237 | A | | 3/1998 | Sato |
| 5,734,237 | A | | 3/1998 | Engel |
| 2004/0145345 | A1 | | 7/2004 | Yang |
| 2009/0039833 | A1 | | 2/2009 | Kitagawa |
| 2012/0068663 | A1 | * | 3/2012 | Tanikawa et al. ............. 320/109 |
| 2013/0265011 | A1 | * | 10/2013 | Nilsson ......................... 320/137 |
| 2014/0111166 | A1 | * | 4/2014 | Yun et al. ...................... 320/162 |

FOREIGN PATENT DOCUMENTS

| DE | 1 563 607 A1 | 11/1970 |
| DE | 10 2007 047 713 A1 | 4/2009 |
| DE | 10 2008 012 418 A1 | 9/2009 |
| DE | 10 2009 000 960 A1 | 8/2010 |

OTHER PUBLICATIONS

International Search Report corresponding to PCT Application No. PCT/EP2011/070486, mailed Dec. 5, 2012 (German and English language document) (7 pages).

* cited by examiner

*Primary Examiner* — Arun Williams
(74) *Attorney, Agent, or Firm* — Maginot, Moore & Beck, LLP

(57) ABSTRACT

The disclosure relates to a method for charging a battery having at least one battery cell. A first connection of a charging device is connected to a first pole of the at least one battery cell by a rectifying device. The rectifying device is set up such that charging current can flow. The disclosure further relates to a charging device, a battery, and a motor vehicle, which are configured to carried out the method.

7 Claims, 2 Drawing Sheets

METHOD FOR CHARGING A BATTERY

This application is a 35 U.S.C. §371 National Stage Application of PCT/EP2011/070486, filed on Nov. 18, 2011, which claims the benefit of priority to Serial No. DE 10 2010 061 763.6, filed on Nov. 23, 2010 in Germany, the disclosures of which are incorporated herein by reference in their entirety.

The present disclosure relates to a method for charging a battery, and to a charging device, a battery and a motor vehicle with which said method can be executed.

BACKGROUND

It is becoming apparent that new battery systems on which very strict requirements in respect of reliability are placed will increasingly be used in future, both in stationary applications (for example in wind power installations) and also in vehicles such as hybrid and electric vehicles. The background for these strict requirements is that failure of the battery can lead to failure of the entire system or even to a safety-critical problem. In wind power installations for example, batteries are used to protect the installation against impermissible operating states by virtue of rotor blade adjustment in strong winds.

In order to achieve the required power and energy data with the battery system, individual battery cells are connected in series and sometimes additionally in parallel.

During driving operation, the battery is typically connected to the vehicle by two contactors. The vehicle additionally contains a so-called intermediate circuit capacitor for cushioning voltage and current spikes. However, this intermediate circuit capacitor prohibits the two main contactors from being directly switched on since, in this case, a very large current would flow through the contactors into the intermediate circuit capacitor and could destroy it.

Therefore, a so-called precharging unit is generally used in the battery, said precharging unit first charging the intermediate capacitor with a limited current. The two main contactors are then connected only after the capacitor is charged.

FIG. 1 shows a basic circuit diagram of a precharging unit of this kind for charging an intermediate circuit capacitor from a battery according to the prior art. A large number of battery cells 11-1, . . . , 11-n are connected in series, and optionally additionally in parallel, in order to achieve a high output voltage and battery capacity which are desired for a respective application. A charging and disconnection device 14 is connected between a positive pole 27 of the battery cells and a positive battery terminal 12. A disconnection device 15 can optionally additionally be connected between a negative pole 28 of the battery cells and a negative battery terminal 13.

The positive battery terminal 12 and the negative battery terminal 13 are connections at which a load can be connected to the battery. By way of example, in a motor vehicle comprising the battery, the motor can be connected to the positive battery terminal 12 and the negative battery terminal 13 during driving operation.

The disconnection and charging device 14 and the disconnection device 15 each comprise a contactor 16 and, respectively, 17, which contactors are provided for the purpose of isolating the battery cells from the battery terminals 12, 13 in order to switch said battery terminals to zero potential. Otherwise, there is a considerable potential for danger to servicing personnel or the like on account of the high DC voltage of the battery cells which are connected in series. A charging contactor 18 with a charging resistor 19, which is connected in series to the charging contactor 18, is additionally provided in the charging and disconnection device 14. The charging resistor 19 limits a charging current for the intermediate circuit capacitor (not shown) when the battery is connected to the intermediate circuit of the vehicle (not shown). To this end, the contactor 16 is initially left open and only the charging contactor 18 is closed. If the voltage across the positive battery terminal 12 reaches the voltage of the battery cells, the contactor 16 can be closed and the charging contactor 18 can optionally be opened. The contactors 16, 17 and the charging contactor 18 considerably increase the costs of a battery since strict requirements are placed on the reliability of said contactors and on the currents which are to be carried by them.

The battery is charged either by means of a charging device being coupled to the vehicle intermediate circuit or by means of the charging device being connected to the battery by means of two additional contactors.

FIG. 2 shows a basic circuit diagram for coupling a charging device to a battery by means of two additional contactors according to the prior art. The charging device 20 is connected to the positive pole 27 of the battery cells by means of the contactor 21 and to the negative pole 28 of the battery cells by means of the contactor 22. These contactors 21, 22 also have to be designed such that they can be opened in the event of a possible short circuit on the charging device side. This is complicated and cost-intensive.

SUMMARY

The disclosure provides a method for charging a battery with at least one battery cell, in which method a first connection of a charging device is connected to a first pole of the at least one battery cell by means of a rectifying means. In this case, the rectifying means is designed in such a way that a charging current can flow. On account of the rectifying means allowing a charging current to flow, but blocking and not allowing current to flow in the opposite direction in the event of a short circuit on the charging device side, with the result that discharging of the battery is prevented, one of the contactors can be dispensed with.

In this case, a rectifying means is to be understood to be an element which allows electrical current to pass in one direction and blocks electrical current in the opposite direction. The rectifying means is preferably a diode, in particular a semiconductor diode.

In the text which follows, a switching means is to be understood to be an element which can be operated such that it either establishes or breaks an electrical connection. A switching means can, in particular, be a contactor in each case.

A second connection of the charging device can be connected to a second pole of the at least one battery cell by means of a switching means. If the battery comprises a plurality of battery cells which are connected in series, the first pole is a first pole of a battery cell at one end of the series circuit, and the second pole is a second pole of a battery cell at the opposite end of the series circuit.

The disclosure further provides a charging device in which a rectifying means is arranged at a first connection of the charging device in such a way that the method according to the disclosure can be executed when the charging device is connected to a battery.

The disclosure further provides a battery which comprises at least one battery cell and a rectifying means, wherein a first connection of the rectifying means is connected to a first pole of the at least one battery cell, wherein a second connection of the rectifying means is connected to a first charging connection, and wherein the rectifying means is arranged in such a way that the method according to the disclosure can be executed when the battery is connected to a charging device. The battery is preferably a lithium-ion battery.

The battery can further comprise a first switching means, wherein a first connection of the first switching means is connected to a second pole of the at least one battery cell, and wherein a second connection of the first switching means is connected to a second charging connection.

The second connection of the first switching means can be connected to a first battery terminal. As an alternative, the battery can further comprise a second switching means, wherein a first connection of the second switching means is connected to the second pole of the at least one battery cell, and wherein a second connection of the second switching means is connected to a first battery terminal.

The battery can further comprise a third switching means, wherein a first connection of the third switching means is connected to the first pole of the at least one battery cell, and wherein a second connection of the third switching means is connected to a second battery terminal.

The battery is preferably a lithium-ion battery.

The disclosure further provides a motor vehicle, in particular an electric motor vehicle, which comprises a battery according to the disclosure, wherein the drive system of the motor vehicle is connected to the battery.

BRIEF DESCRIPTION OF THE DRAWINGS

Exemplary embodiments of the disclosure will be explained in greater detail with reference to the following description and the drawings, in which.

DETAILED DESCRIPTION

Figure 2:
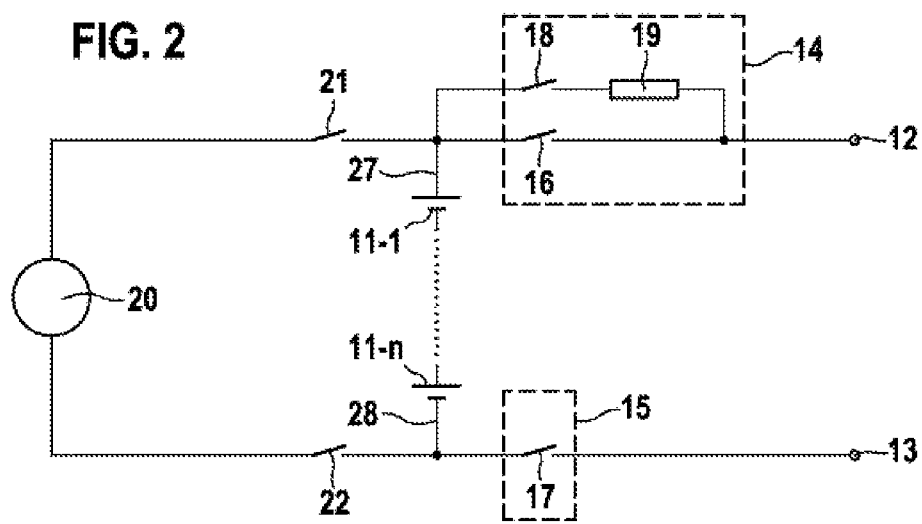
FIG. 2 shows a basic circuit diagram for coupling a charging device to a battery by means of two additional contactors according to the prior art.
Figure 3:
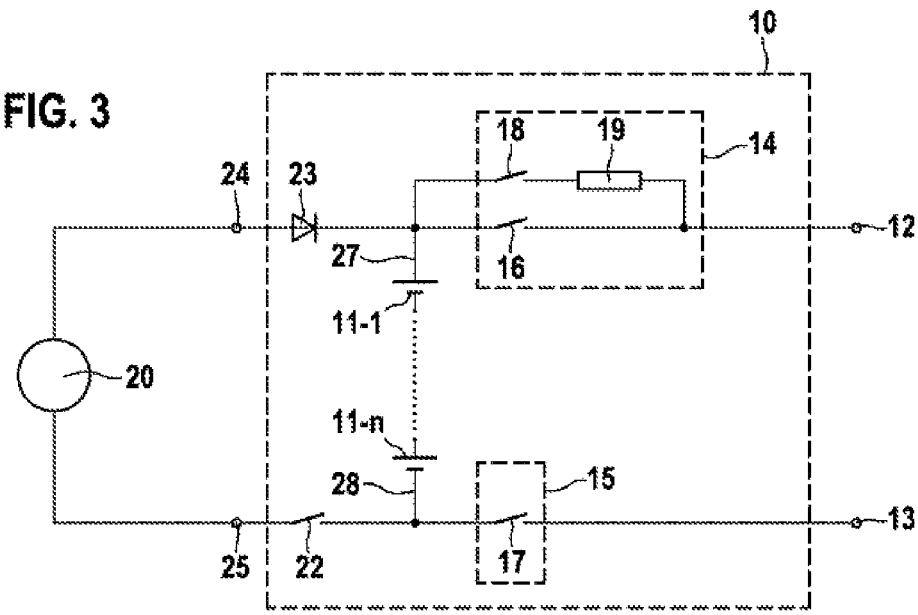
FIG. 3 shows a basic circuit diagram of a first exemplary embodiment of a battery according to the disclosure which is charged by means of the method according to the disclosure.

FIG. 3 shows a first exemplary embodiment of a battery 10 according to the disclosure which is charged using the method according to the disclosure. Like the battery according to the prior art shown in FIGS. 1 and 2, the battery 10 according to the disclosure comprises a large number of battery cells 11-1, ..., 11-n. A charging and disconnection device 14 is connected between a positive pole 27 of the battery cells and a positive battery terminal 12. A disconnection device 15 can optionally additionally be connected between a negative pole 28 of the battery cells and a negative battery terminal 13. The disconnection and charging device 14 and the disconnection device 15 each comprise a contactor 16 and, respectively, 17, which contactors are provided for the purpose of isolating the battery cells 11-1, ..., 11-n from the battery terminals 12, 30 in order to switch said battery terminals to zero potential. A charging contactor 18 with a charging resistor 19, which is connected in series to the charging contactor 18, is additionally provided in the charging and disconnection device 14.

Figure 1:
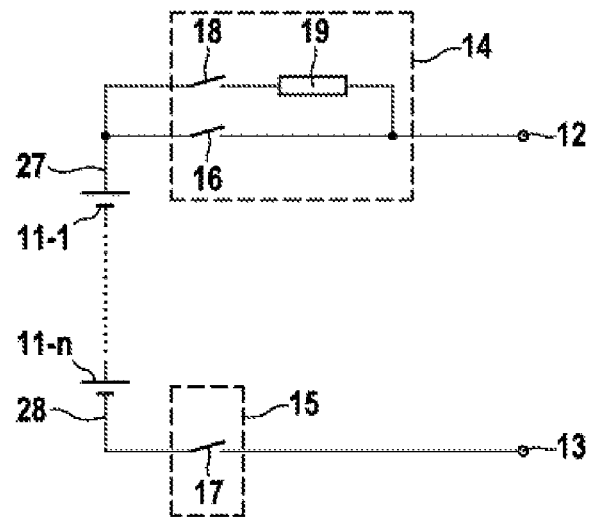
FIG. 1 shows a basic circuit diagram of a precharging unit for charging an intermediate circuit capacitor from a battery according to the prior art.

In contrast to the battery according to the prior art shown in FIGS. 1 and 2, the battery 10 according to the disclosure further comprises a diode 23, the cathode of said diode being connected to the positive pole 27 of the battery cells and the anode of said diode being connected to a positive charging connection 24. The negative pole 28 of the battery cells is connected to a negative charging connection 25.

The positive charging connection 24 and the negative charging connection 25 are connections at which a charging device 20 can be connected to the battery. If a charging device 20 is connected to the charging connections 24, 25, a charging current which charges the battery can flow across the diode 23. If, however, the charging connections 24 and 25 are short-circuited, the diode 23 is reverse-biased.

A contactor 22 can be arranged between the negative pole 28 of the battery cells and the negative charging connection 25.

The diode 23 can also selectively be arranged between the negative pole 28 of the battery cells and the negative charging connection 25 (not shown); in this case, the anode of the diode 23 is connected to the negative pole 28 of the battery cells, and the cathode of the diode 23 is connected to the negative charging connection 25. In this case, a contactor can be arranged between the positive pole 27 of the battery cells and the positive charging connection 24.

Figure 4:
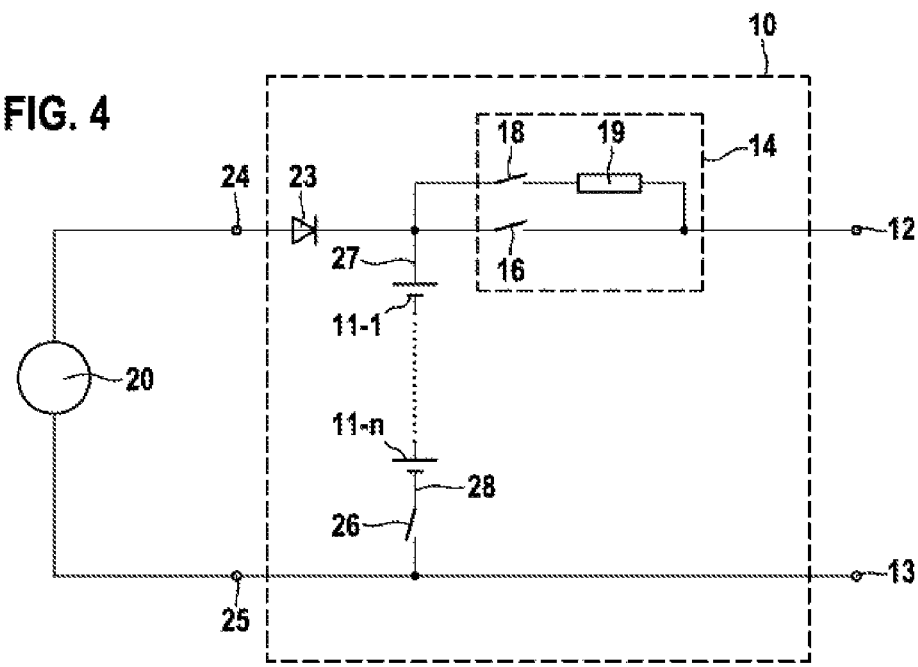
FIG. 4 shows a basic circuit diagram of a second exemplary embodiment of a battery according to the disclosure which is charged by means of the method according to the disclosure.

In the first exemplary embodiment of the battery according to the disclosure, the negative pole 28 of the battery cells, as in the case of the battery according to the prior art, is optionally connected to the negative battery terminal 13 by means of a contactor 17. FIG. 4 shows a second exemplary embodiment of the battery according to the disclosure which comprises a contactor 26, one connection of said contactor being connected to the negative pole 28 of the battery cells and the other connection of said contactor being connected both to the negative battery terminal 13 and also to the negative charging connection 25. The contactor 26 is therefore arranged in series with the battery cells 11-1, ..., 11-n. On account of the negative pole 28 of the battery cells being connected to the negative battery terminal 13 and to the negative charging connection 25 by means of the same contactor 26, a further contactor is saved. The contactor 26 fulfils a dual function of being able to interrupt the flow of current both during driving operation and during charging operation.

In the above-described exemplary embodiments of the present disclosure, the diode 23 is designed as part of the battery. However, the disclosure is not restricted to this. The method according to the disclosure can also be carried out when the diode is designed as part of the charging device (not shown). In this case, the diode is arranged at a connection of the charging device which is connected to a charging connection of the battery during charging. By way of example, the charging device can have a diode, the cathode of said diode being connected to that connection of the charging device which is connected to the positive charging connection of the battery during charging. If there is a short circuit in the charging device in this case, the diode is reverse-biased and prevents discharging of the battery.

The invention claimed is:
1. A battery comprising:
at least one battery cell having a positive pole and a negative pole, the at least one battery cell being configured to provide power for a load;
positive and negative battery terminals configured to provide power to the load from the at least one battery cell;
positive and negative charging terminals configured to connect to a charging device to charge the at least one battery cell, the positive and negative charging terminals being separate from the positive and negative battery terminals;

a first disconnection device connected in a first current path between the positive pole of the at least one battery cell and the positive battery terminal, the first disconnection device being configured to selective disconnect the positive pole of the at least one battery cell from the positive battery terminal; and a rectifying device connected in a second current path between the positive pole of the at least one battery cell and the positive charging terminal, the rectifying device configured to allow current to flow from the positive charging terminal to the positive pole of the at least one battery cell, the second current path not overlapping with the first current path.

2. The battery according to claim 1, further comprising:
a second disconnection device connected in third current path between the negative pole of the at least one battery cell and the negative battery terminal, the second disconnection device being configured to selectively disconnect the negative pole of the at least one battery cell from the negative battery terminal.

3. The battery according to claim 2, wherein the negative charging terminal is connected directly to the negative battery terminal.

4. The battery according to claim 2, further comprising:
a third disconnection device connected in a fourth current path between the negative pole of the at least one battery cell and the negative charging terminal, the third disconnection device being configured to selectively disconnect the negative pole of the at least one battery cell from the negative charging terminal.

5. The battery according to claim 1, wherein:
the battery is included in an electric motor vehicle, and
a drive system of the electric motor vehicle is connected to the battery.

6. A circuit for charging a battery comprising:
a charging device having positive and negative connections and configured to provide power via the positive and negative connections; and
a battery comprising:
at least one battery cell having a positive pole and a negative pole, the at least one battery cell being configured to provide power for a load;
positive and negative battery terminals configured to provide power to a load from the at least one battery cell;
positive and negative charging terminals respectively connected to the positive and negative connections of the charging device to charge the at least one battery cell, the positive and negative charging terminals being separate from the positive and negative battery terminals;
a first disconnection device connected in a first current path between the positive pole of the at least one battery cell and the positive battery terminal, the first disconnection device being configured to selective disconnect the positive pole of the at least one battery cell from the positive battery terminal; and
a rectifying device connected in a second current path between the positive pole of the at least one battery cell and the positive charging terminal, the rectifying device configured to allow current to flow from the positive charging terminal to the positive pole of the at least one battery cell, the second current path not overlapping with the first current path.

7. A method of charging a battery comprising:
providing a battery including (i) at least one battery cell having a positive pole and a negative pole, the at least one battery cell being configured to provide power for a load, (ii) positive and negative battery terminals configured to provide power to a load from the at least one battery cell, (iii) positive and negative charging terminals configured to connect to a charging device to charge the at least one battery cell, the positive and negative charging terminals being separate from the positive and negative battery terminals, (iv) a first disconnection device connected in a first current path between the positive pole of the at least one battery cell and the positive battery terminal, the first disconnection device being configured to selective disconnect the positive pole of the at least one battery cell from the positive battery terminal, and (v) a rectifying device connected in a second current path between the positive pole of the at least one battery cell and the positive charging terminal, the rectifying device configured to allow current to flow from the positive charging terminal to the positive pole of the at least one battery cell, the second current path not overlapping with the first current path;
connecting positive and negative connections of a charging device to a the positive and negative charging terminals, the charging device configured to provide power via the positive and negative connections; and
operating the charging device to provide a charging current that flows through the rectifying device of the battery to charge the at least one battery cell of the battery.

* * * * *